United States Patent
Kapelner et al.

(10) Patent No.: US 12,518,521 B2
(45) Date of Patent: Jan. 6, 2026

(54) METHOD FOR TRAINING A CONVOLUTIONAL NEURAL NETWORK

(71) Applicant: Robert Bosch GmbH, Stuttgart (DE)

(72) Inventors: Tamas Kapelner, Hildesheim (DE); Thomas Wenzel, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 461 days.

(21) Appl. No.: 18/298,613

(22) Filed: Apr. 11, 2023

(65) Prior Publication Data
US 2023/0368334 A1    Nov. 16, 2023

(30) Foreign Application Priority Data
May 13, 2022  (DE) ............... 10 2022 204 722.2

(51) Int. Cl.
| | |
|---|---|
| G06V 10/82 | (2022.01) |
| G06N 3/0464 | (2023.01) |
| G06N 3/08 | (2023.01) |
| G06T 3/40 | (2024.01) |

(52) U.S. Cl.
CPC .......... *G06V 10/82* (2022.01); *G06N 3/0464* (2023.01); *G06N 3/08* (2013.01); *G06T 3/40* (2013.01)

(58) Field of Classification Search
CPC ... G06T 3/40–4092; G06T 2207/20081; G06T 2207/20084; G06V 10/82; G06V 10/454; G06N 3/02–0985
See application file for complete search history.

(56) References Cited

U.S. PATENT DOCUMENTS

2023/0021551 A1*  1/2023  Lu ................. G06V 10/764

OTHER PUBLICATIONS

Liu, Yanfei, Yanfei Zhong, and Qianqing Qin. "Scene classification based on multiscale convolutional neural network." IEEE Transactions on Geoscience and Remote Sensing 56.12 (2018): 7109-7121. (Year: 2018).*
Kim, Yonghyun, Bong-Nam Kang, and Daijin Kim. "SAN: Learning Relationship Between Convolutional Features for Multi-scale Object Detection." European Conference on Computer Vision. Cham: Springer International Publishing, 2018. (Year: 2018).*
Wu, Jialian, et al. "Self-mimic learning for small-scale pedestrian detection." Proceedings of the 28th ACM International Conference on Multimedia. 2020. (Year: 2020).*

(Continued)

*Primary Examiner* — Geoffrey E Summers
(74) *Attorney, Agent, or Firm* — NORTON ROSE FULBRIGHT US LLP (57) ABSTRACT

A method for training a convolutional neural network. For each of a multiplicity of training input images, the method includes processing of the training input image by the convolutional network; processing of a scaled version of the training input image by the convolutional network; determining a pair of convolutional layers of the convolutional network so that a convolutional layer of the pair generates a first feature map for the training input image which has the same size as a second feature map which is generated by the other convolutional layer of the pair for the scaled version of the training input image; and calculating a loss between the first feature map and the second feature map; and training the convolutional neural network to reduce an overall loss which includes the calculated losses.

7 Claims, 5 Drawing Sheets

(56) References Cited

OTHER PUBLICATIONS

Takimoglu, "What is Data Augmentation? Techniques & Examples In 2022," AI Multiple, The Way Back Machine, 2022, pp. 1-11.
Li et al., "Delta: Deep Learning Transfer Using Feature Map With Attention for Convolutional Networks," ICLR 2019 Conference Blind Submission, 2019, pp. 1-13.

* cited by examiner

METHOD FOR TRAINING A CONVOLUTIONAL NEURAL NETWORK

CROSS REFERENCE

The present application claims the benefit under 35 U.S.C. § 119 of German Patent Application No. DE 10 2022 204 722.2 filed on May 13, 2022, which is expressly incorporate herein by reference in its entirety.

FIELD

The present disclosure relates to methods for training a convolutional neural network.

BACKGROUND INFORMATION

In many computer-vision applications such as an object detection or semantic segmentation, a detection of patterns at multiple scales, e.g., both large (near) and small (distant) objects in an image, is indispensable. A common practice in such applications is the use of multi-scale networks, that is, convolutional neural networks (CNN) in which the output is directly connected to multiple convolutional layers of the networks that operate on data having different resolutions. This concept is most often used in an object detection but may also be employed for a standard image classification, for example, or for the detection of patterns rather than objects.

This is based on the idea that small objects (or patterns) are easier to detect at higher resolutions, whereas convolutional layers with a lower resolution should be better at detecting features because they lie deeper within the network (i.e., at a greater distance from the input of the neural network). It is assumed that the combination of both promotes the agreement of the features during training, that is, that the features for the same objects (or, more generally, image elements) are determined in a similar manner, regardless of the scaling of the object in the input image of the neural network. Some methods promote the justification of this assumption according to which the representation of the image features is similar across the scalings by using shared features in different scalings. This means that the feature ascertainment takes place independently of the resolution of the convolutional layers having the same convolutions (that is, the same convolutional kernels).

However, it may happen that each scaling has a "reserved subspace" in the input space of the shared features because the neural network has learned during its training to store at least some features separately.

For this reason, approaches are desirable that enable the training of a neural network which has multiple convolutional layers that determine features for different resolutions, so that the neural network detects the same features for image elements that have been scaled differently but have the same features.

SUMMARY

According to different embodiments of the present invention, a method is provided for training a convolutional neural network which, for each of a multiplicity of training input images, includes processing the training input image by the convolutional network; processing a scaled version of the training input image by the convolutional network; determining a pair of convolutional layers of the convolutional network so that a convolutional layer of the pair generates a first feature map for the training input image which has the same size as a second feature map which is generated by the other convolutional layer of the pair for the scaled version of the training input image; and calculating a loss between the first feature map and the second feature map, and training the convolutional neural network to reduce an overall loss which includes the calculated losses.

The afore-described method makes it possible to train a neural network so that if the same feature is represented in input data at a different scalings, the neural network detects the feature for each of these representations. For example, for an image element which exists (at least in similar form) at different scalings in an input image, the network may detect the same features and thereby classify the image element in the same way in all scalings, for instance. In this way, the method is able to increase the performance of the neural network without requiring additional memories or additional processing resources.

The afore-described method may be applied to any type of neural network having layers that operate on different resolutions and is not restricted to a particular task. For example, the neural network is able to be trained for an image classification and semantic segmentation. It is also not restricted to computer vision and the processing of RGB image data, for instance. The neural network is also trainable and usable for processing radar data or lidar data, for example.

Different exemplary embodiments of the present invention are described in the following text.

Exemplary embodiment 1 is a method for training a convolutional neural network, as described above.

Exemplary embodiment 2 is a method according to the exemplary embodiment 1, in which the scaled version of the training input image is generated by scaling the training input image using the downsampling factor between successive convolutional layers of the convolutional network, a power of the downsampling factor, the reciprocal value of the downsampling factor, or a power of the reciprocal value of the downsampling factor.

This makes it possible to find feature maps that correspond to one another in terms of their size, between which a loss is able to be calculated. The downsampling factor, for example, is a pooling factor or the downsampling factor by a stride of the convolution, i.e., a stride factor.

Exemplary embodiment 3 is a method according to the exemplary embodiment 1 or 2, in which the overall loss furthermore has a training loss for training the convolutional network for a predefined task, and the method furthermore encompasses weighting of the calculated losses in the overall loss vis-à-vis the training loss.

The loss between the feature maps may thus are given by an additional loss term in a loss function, which additionally has a "normal" loss, i.e., a training loss for the task of the neural network (such as a classification loss or segmentation loss), these losses being weighted relative to one another. The choice of this weighting makes it possible to control the degree of the feature correspondence achieved by the training.

Exemplary embodiment 4 is a method according to the exemplary embodiments 1 to 3, which includes determining multiple pairs of convolutional layers of the convolutional network for each of the multiplicity of training input images so that for each pair, a convolutional layer of the pair generates a first feature map for the training input image which has the same size as a second feature map which is generated by the other convolutional layer of the pair for a respective scaled version of the training input image, a loss between the first feature map and the second feature map is calculated, and the overall loss includes the losses calculated for the pairs.

In this way, the convolutional network is able to be trained in such a way that a feature correspondence exists not only between two convolutional layers but also between multiple convolutional layers. The convolutional network is also able to process differently scaled versions of the training input image so that pairs of convolutional layers are able to be determined, which differ by the degree to which scaling takes place between the two convolutional layers (e.g., the distance at which the convolutional layers are situated from one another in terms of their depth in the convolutional network).

Exemplary embodiment 5 is a method according to one of the exemplary embodiments 1 to 4, in which the neural network is trained with the aid of a training dataset of training input images, the multitude of training input images is selected from the training dataset, and scaled versions of the training input images are generated for the training input images so that the convolutional network has a pair of convolutional layers for each training input image of the multitude of training input images and each scaled version of the training input image, so that a convolutional layer of the pair generates a feature map for the training input image which has the same size as a feature map which is generated by the other convolutional layer of the pair for the scaled version of the training input image.

By selecting the percentage of the training input images from the training data for which scaled input images are generated and used during the training according to the afore-described method, the degree of the feature correspondence achieved by the training is able to be controlled. The scaled versions may be generated for different distances of convolutional layers in terms of their depth in the convolutional network.

Exemplary embodiment 6 is a training device for a convolutional neural network, which is designed to execute a method according to one of the exemplary embodiments 1 to 5.

Exemplary embodiment 7 is a computer program which includes commands that when executed by a processor, induce the processor to execute a method according to one of the exemplary embodiments 1 to 5.

Exemplary embodiment 8 is a computer-readable medium, which stores commands that when executed by a processor, induce the processor to execute a method according to one of the exemplary embodiments 1 to 5.

Similar reference numerals in the figures generally refer to the same parts in all the different views. The figures are not necessarily true to scale, the general focus instead being placed on illustrating the principles of the present invention. In the following description, different aspects of the present invention will be described with reference to the figures.

DETAILED DESCRIPTION OF EXAMPLE EMBODIMENTS

The following detailed description relates to the figures which, by way of explanation, show example details and aspects of this disclosure by which the present invention is able to be executed. Other aspects may be used, and structural, logical and electrical modifications are able to be implemented without departing from the protective scope of the present invention. The different aspects of this disclosure do not necessarily exclude one another because some aspects of this disclosure may be combined with one or more other aspect(s) of this disclosure in order to form new aspects.

Different example embodiments of the present invention will be described in greater detail in the following text.

In machine learning, a function which maps input data to output data is learned. In supervised learning (e.g., the training of a neural network or some other model), an input dataset (also referred to as a training dataset), which specifies for each input a desired output (e.g., a desired classification of the input data), the function is determined in such a way that it maps this assignment of inputs to outputs as best as possible.

Figure 1:
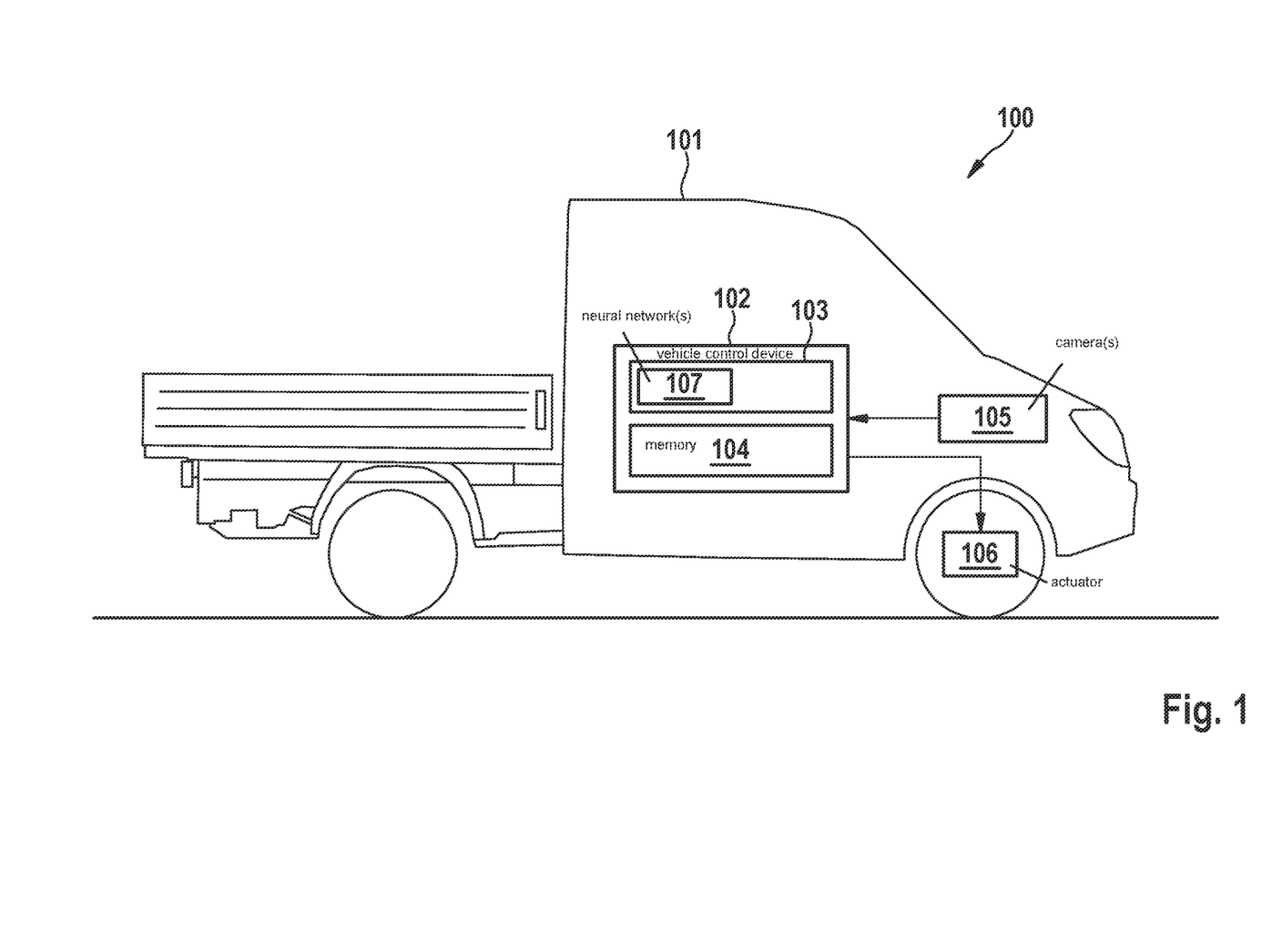
FIG. 1 shows a vehicle according to an example embodiment of the present invention.

One example of an application of such a machine-learned function is the object classification or semantic segmentation in digital images, e.g., for autonomous driving, as illustrated in FIG. 1.

FIG. 1 shows an (e.g., autonomous) vehicle 101.

In the following text, it should be noted that images or image data quite generally are considered a collection of data that represent one or more object(s) or pattern(s). The image data may be supplied by sensors which measure visible or invisible light such as infrared or ultraviolet light, ultrasonic or radar waves, or other electromagnetic or acoustic signals.

In the example of FIG. 1, vehicle 101, e.g., a passenger car or truck, is equipped with a vehicle control device 102.

Vehicle control device 102 has data processing components such as a processor (e.g., a CPU (central unit) 103, and a memory 104 for storing control software based on which vehicle control device 102 is operating, and data which are processed by processor 103.

For example, the stored control software (computer program) has instructions that when executed by the processor, induce processor 103 to implement one or more neural network(s) 107.

The data stored in memory 104 may include image data, for instance, which are acquired by one or more camera(s) 105. For example, the one camera or the multiple cameras 105 may record one or more gray-scale or color photos of the environment of vehicle 101.

Based on the image data, vehicle control device 102 is able to determine whether and which objects, e.g., solid objects such as traffic signs or road markings, or mobile objects such as pedestrians, animals or other vehicles, are present in the environment of vehicle 101.

Vehicle control device 102 can then control vehicle 101 according to the results of the object determination. For example, vehicle control device 102 is able to control an actuator 106 (such as a brake) in order to control the speed of the vehicle such as to decelerate the vehicle.

According to one embodiment, in the example of FIG. 1, the control is carried out on the basis of an image classification or a semantic segmentation, which is performed by a neural network.

Figure 2:
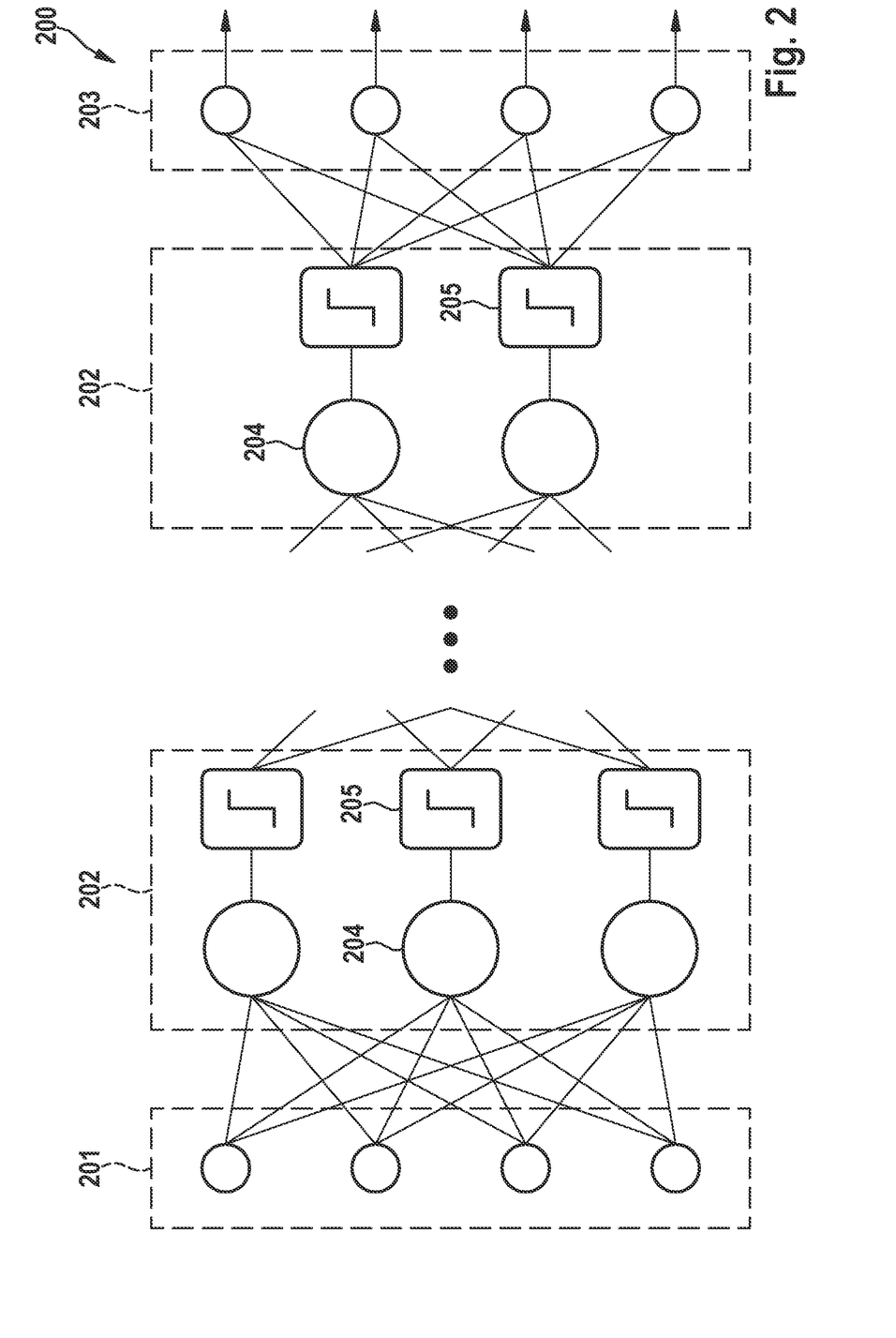
FIG. 2 shows an example of a neural network, according to the present invention.

FIG. 2 shows an example of a neural network 200 which is designed to map input data to output data; the neural network, for instance, may be designed to classify images into a previously defined number of classes.

In this example, neural network 200 has an input layer 201, multiple "hidden" layers 202, and an output layer 203.

It should be noted that neural network 200 is a simplified example of an actual neural network, which may include many more processing nodes and hidden layers.

The input data correspond to input layer 201 and may generally be considered a multidimensional array of values; for instance, an input image may be considered a two-dimensional array of values that correspond to the pixel values of the image. The input of input layer 201 is connected to processing nodes 204.

If a layer 202 is a "completely connected" layer, then a processing node 204 multiplies each input value of the input data of the layer by a weight and sums the calculated values. In addition, a node 204 may add a bias to the sum. In a completely connected layer, processing node 204 is followed by a nonlinear activation function 205, e.g., a ReLu unit ($f(x)=\max(0,x)$) or a sigmoid function ($f(x)=1/(1+\exp(-x))$). The resulting value is then output to the next layer.

However, at least a portion of layers 202 may also have layers that are not fully connected, e.g., convolutional layers in the case of a convolutional neural network.

Output layer 203 receives values from last layer 202 (of the sequence of layers 202). Output layer 203 typically processes these received values and then outputs them for further processing. In a case where the neural network is used for an image classification, for example, output layer 203 converts the received values into confidences, each confidence indicating the certainty that an image corresponds to a respective previously defined class. Output layer 203 may then output the class having the highest probability as a predicted class for the further processing. To train neural network 200, it is possible to ascertain for training data having a known class assignment whether the class predicted by neural network 200 agrees with the known class, or the probability the neural network has ascertained for the known class is able to be evaluated, typically with the aid of a loss function. A similar approach may be used when neural network 200 is trained for a segmentation or regression.

It should be noted that the classification of an image may be considered equivalent to the classification of an object shown in the image. If an original image has multiple objects as in autonomous driving, a semantic segmentation is able to be performed (possibly by another neural network) so that each segment shows an object, and the segments are used as input for the neural network classifying the image.

Convolutional neural networks (CNN) are special types of neural networks that are particularly suited to analyze and classify image data.

Figure 3:
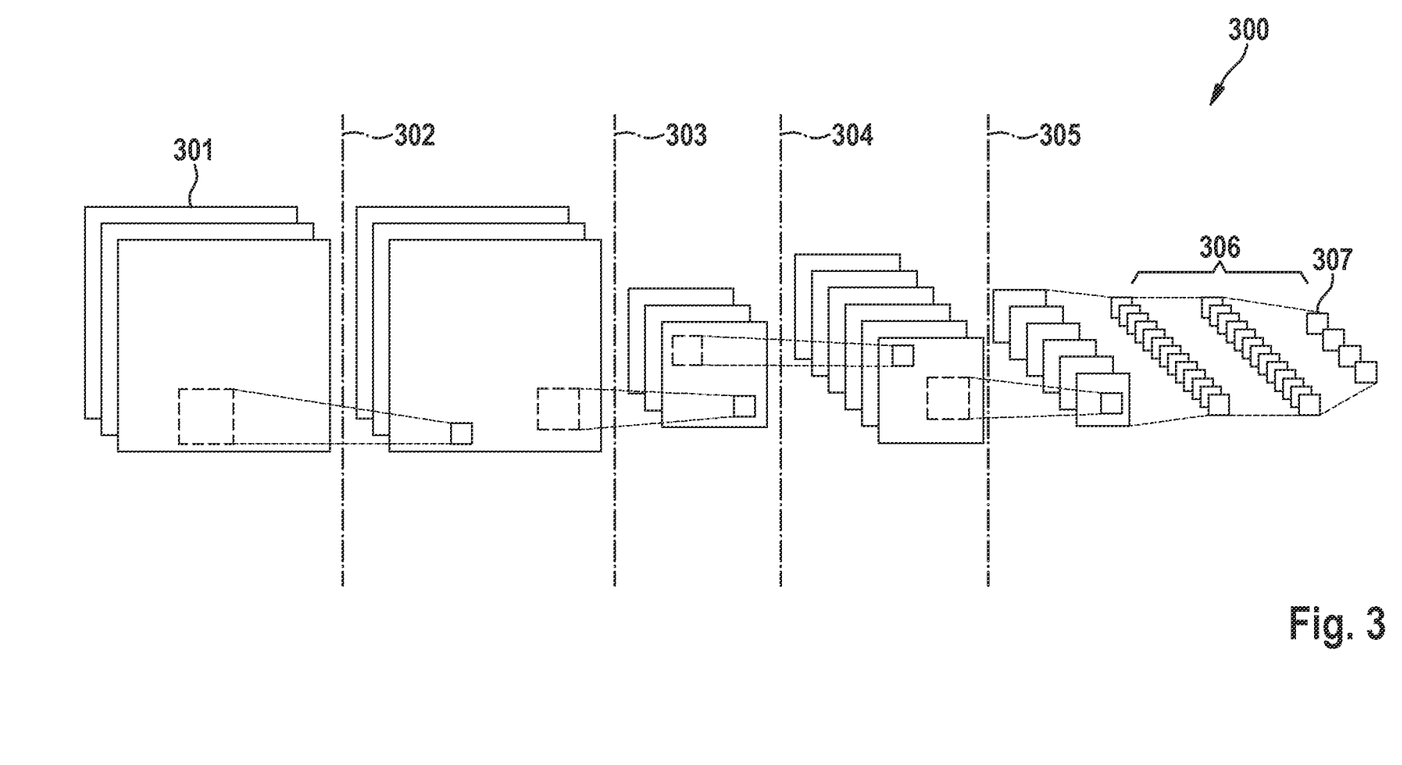
FIG. 3 shows an example of a convolutional neural network, according to the present invention.

FIG. 3 shows an example of a convolutional neural network 300.

It is pointed out here that only the input and/or output data of the different layers of neural network 300 are shown in the representation of FIG. 3 and that the layers are only symbolized by dashed lines. The layers may have a form as described with reference to FIG. 2.

The input data correspond to an input layer 301. For example, the input data are RGB images, which may be considered three two-dimensional matrices (which correspond to the pixel values of the image). The three matrices may also be viewed as a single three-dimensional field, which is also known as a tensor. A tensor may be considered an n-dimensional field (or array) and be understood as a generalization of a matrix.

Convolutional neural networks often use three- and four-dimensional tensors; for instance, multiple RGB images may be understood as four-dimensional tensors (number of images*number of channels (such as three)*height*width).

The input data are processed by a first convolution operation layer 302. In a convolution operation layer, the input data are modified by convolution filters, also known as convolution-based filters, which may be considered a (two- or also three-dimensional) array of values.

The convolution filters take a subset of the input data and subject it to a convolution. It may be interpreted as representing possible features in the input data such as a certain form.

A convolution filter is typically moved across the entire input data (of layer 202 to which the convolution filter belongs) in a "pixel-wise" manner. In the case of RGB images as input data, for example, the convolution filters correspond to three-dimensional tensors (or three filter matrices "on top of one another") and are moved across all "pixels" (elements) of the images. However, other step lengths (strides) may also be employed for the filters, e.g., a stride width of 2, which means that only every second value is examined.

In convolution operation layer 302, the convolution filters are typically followed by a nonlinear activation function (not shown in FIG. 3) such as a ReLU unit.

The data are then forwarded to a pooling layer 303. In pooling layer 303, a filter is likewise moved across the input data, this filter usually outputting the maximum or the average of multiple input values. In other words, the pooling layer merges multiple input values, i.e., aggregates them, which is why it is also referred to as an aggregation layer. The operation of the pooling layer may also be seen as subsampling, which is why it may also be called a subsampling layer.

In other words, a pooling layer may be considered a form of nonlinear downsampling in which the data quantity is reduced by combining the outputs of multiple nodes in the next layer to a single node, e.g., by incorporating the maximum value of the outputs. As an alternative to pooling, the convolutional layers may apply the respective convolution filter not to every pixel but skip pixels at a specific stride width (this is also referred to as striding). In this way, too, downsampling takes place.

There is typically no activation function in pooling layer 303, which is why the pooling together with the preceding convolution operation layer 302 may also be considered part of a convolutional layer (because each layer of a neural network usually has an activation function). In this document, a convolutional layer thus is understood as a convolution operation layer 302 including an activation function and (if provided) a following pooling layer 303 (or a convolutional layer featuring downsampling by striding). The output of each convolutional layer is a feature map.

In the illustrated example of FIG. 3 including pooling, pooling layer 303 is followed by a second convolutional operation layer 304, which in turn is followed by a second pooling layer 305.

It should be noted that it is also possible that a convolution operation layer may be followed by a further convolution operation layer, and that many more convolution and/or pooling layers may be part of a convolutional neural network.

While the input of the first convolution operation layer 302 is a digital image, for example, the input of a following convolution operation layer 304 is a feature map which is output by the preceding convolutional layer (that is, pooling layer 303, as the case may be).

One or more fully connected layers 306 follow the second convolutional layer. Prior to that, the tensor obtained from the second convolutional layer is flattened into a (one-dimensional) vector.

An output layer receives the data from the last fully connected layer 306 and outputs output data 307.

The output layer may include processing such as the conversion of values into probabilities or probability vectors, e.g., by an application of the softmax function or the sigmoid function, whereupon the class having the highest probability is output for further processing.

It is pointed out that a convolutional neural network need not necessarily have one (or a plurality of) fully connected layer(s) (or must have such at the end). It is also possible that a convolutional neural network processes multiple layers in parallel.

Because of the downsampling that is induced by the pooling layers and/or striding, the input data for deeper convolutional layers (i.e., convolutional layers at a greater distance from input layer 301 in the processing direction) have lower resolutions than layers at a lower depth. Put another way, the convolutional layers ascertain features for different resolutions.

The case may now arise that an image element can be seen multiple times in an image (such as similar vehicles), but at different sizes (for instance because one of the vehicles is farther away than the other). This means that an image element may appear in an image (at least similarly) at different scalings. It is desirable in such a case that the neural network detects the same features for the image element in all of its scalings, i.e., that the convolutional layers detect mutually corresponding features for different scalings. More generally, if the same feature is represented at different scalings, it is desirable that this feature be detected for each of these representations.

To achieve such a correspondence of (detected) features for different scalings, a training method is provided according to different embodiments, which forces such a correspondence (to a certain degree). The degree of the feature similarities of representations of the same features (that is, of image elements having the same features), i.e., the degree of the feature correspondence, is controllable. In addition, the evaluation of objects of different scalings with the aid of a classifier (e.g., a last convolutional layer of a neural network) simplifies the training and ultimately reduces the complexity of the learning task.

Figure 4:
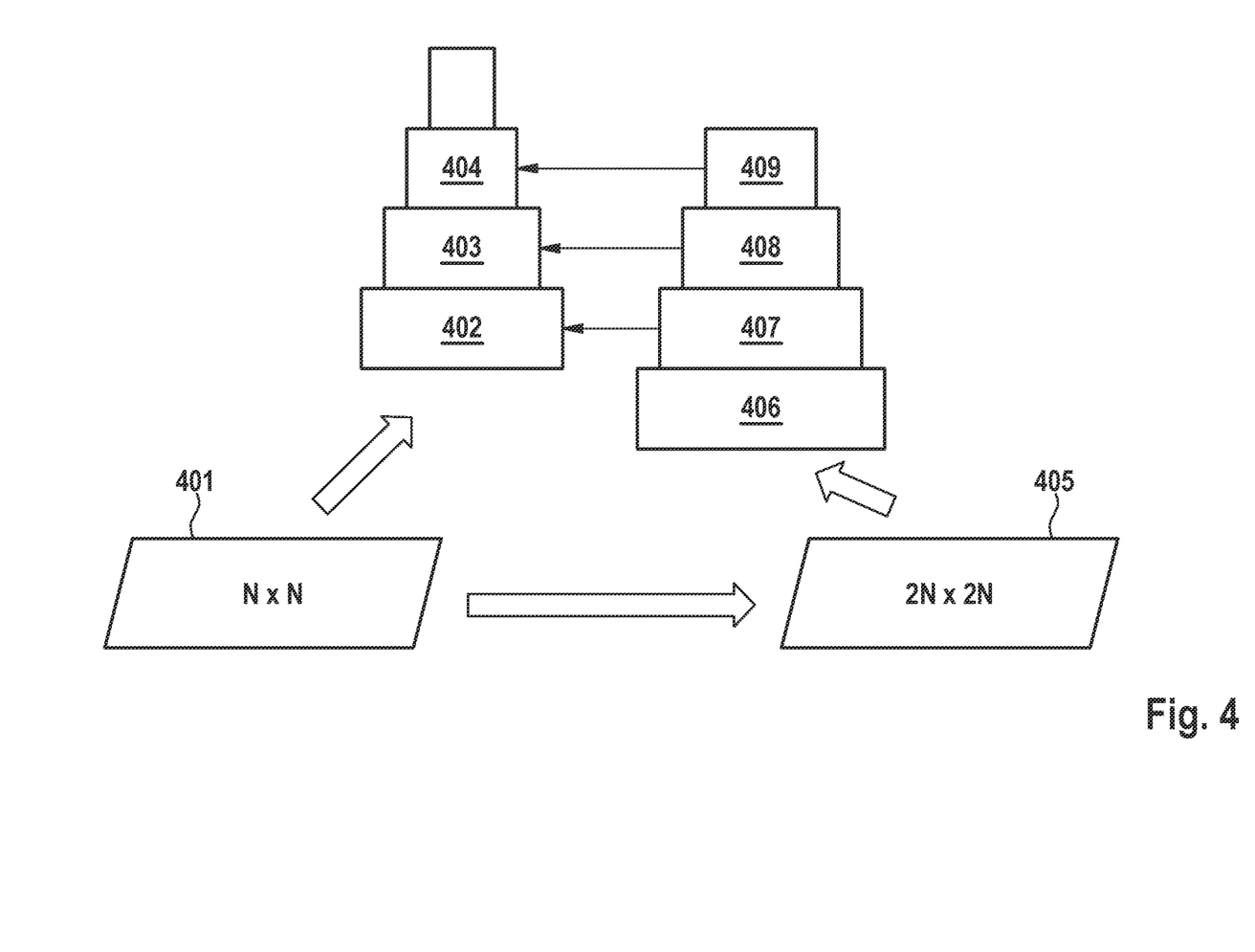
FIG. 4 illustrates a training of a neural network for a feature correspondence between pairs of layers according to one example embodiment of the present invention.

FIG. 4 illustrates a training of a neural network for a feature correspondence according to one embodiment.

It is assumed that input image 401 of the size N×N is processed in succession by convolutional layers of a convolutional neural network (each including a pooling layer and/or striding), as described above with reference to FIG. 3.

After the first convolutional layer (depth d=1), the result is a first feature map 402, after the second convolutional layer (depth d=2), the result is a second feature map 403, and after the third convolutional layer (depth d=3), the result is a third feature map 404. Each feature map 402, 403, 404 has an assigned scaling s, i.e., has a size N/s×N/s. For instance, if the scaling factor from layer to layer is 2 (standard pooling), then the size (and therefore the resolution) of the feature map output by the convolutional layer having depth d is $N/2^d \times N/2^d$, that is, $s=2^d$.

However, if a version 405 of input image 401 scaled to 2N×2N is supplied to the neural network, then the feature map output by the convolutional layer having depth d has the size $N/2^{d-1} \times N/2^{d-1}$, or in other words, the same scaling is achieved only one convolutional layer later. Specifically, (fourth) feature map 406 generated for the scaled input image (that is, the scaled version of the input image) by the first convolutional layer (depth d=1) has the size N×N; the (fifth) feature map 407 generated for the scaled input image by the second convolutional layer (depth d=2) has the size N/2*N/2; the (sixth) feature map 408 generated for the scaled input image by the third convolutional layer (depth d=3) has the size N/4×N/4; and (seventh) feature map 409 generated for the scaled input image by the fourth convolutional layer (depth d=4) has the size N/8×N/8.

Thus, there is a correspondence with regard to the size between first feature map 402 and fifth feature map 407, between second feature map 403 and sixth feature map 408, and between third feature map 404 and seventh feature map 409.

Since these feature maps originate from the same image (but at different scalings), they should include the same features (e.g., in order to detect an included object in both scalings).

According to different embodiments, this is achieved by requiring an explicit correspondence between the feature map that is output for input image 401 by the convolutional layer having a depth d, and the feature map that is output for the scaled version of input image 405 by the convolutional layer having a depth d+1, since these convolutional layers should detect the same features (e.g., patterns). To this end, the neural network is trained with the aid of a loss function which includes a (similarity-based) loss term which receives a difference between these two feature maps. This loss term is inserted as an additional loss term into the loss function (in addition to the normal loss by which the neural network is to be trained according to its function, that is, a classification or segmentation loss), for instance for multiple pairs of layers (such as all possible layers), that is:

a loss term for the difference between first feature map 402 and fifth feature map 407, a loss term for the difference between second feature map 403 and sixth feature map 408, and a loss term for the difference between third feature map 404 and seventh feature map 409

(for input images 401 and their scaled versions 405 of a training batch, summed or averaged across the input images).

For instance, the loss term is the value of a distance metric such as an L2-loss between the two feature maps, so that during training of the neural network to reduce (ideally, minimize) the loss function, the best possible agreement (on average across the input images) in the mutually corresponding feature maps comes about for each input image 401 (with regard to their size).

The loss term is used for pairs of input images 401, 405, one being a scaled version of the other. This does not have to be done for all input images of the batch. In the above example, scaled version 405 is larger than input image 401, that is, generally has the size N*F×N*F, where F (above, F=2) is the scaling factor between layers of the convolutional layers (or a whole-number power thereof, because correspondences can similarly also be forced between convolutional layers that are situated at a greater distance from one another; the scaling ratio between input image 401 and scaled version 405 may be chosen as desired as long as it can be translated into a correspondence of feature maps which are generated by convolutional layers of different depths). Similarly, it is also possible to use the reciprocal value of F, that is, to scale input image 401 down to scaled input image 405. The above relationships are then correspondingly reversed. It is also possible to generate multiple scaled versions for an input image and, depending on the scaling ratios, to insert corresponding loss terms into the loss function. The loss function may also be applied in such a way that only the areas that include an object are considered, that is to say, the loss term is not calculated between the whole feature maps but for a section, the section corresponding to an extension of the object scaled by s.

The extent to which the neural network is to be trained for a feature correspondence between feature maps generated by convolutional layers of different depths is able to be adjusted by the selection of the weighting of the additional loss term (or the additional loss terms for multiple pairs of feature maps) in the loss function (that is, in the overall loss), and by the number of input images of the training data for which scaled versions are generated and for which the additional loss term (or the additional loss terms) is/are used accordingly.

For a pair made up of input image 401 and a scaled version 405 thereof, input image 401 and the scaled version 405 thereof can then be successively conveyed to the neural network to ascertain respective feature maps 402 to 404 and 406 to 409.

As an alternative, there may be two (or more) entities of the neural network, in the sense of a Siamese network, where input image 401 is supplied to one entity and a scaled version 405 is supplied to another entity. The neural network is then able to be trained in parallel with the aid of input images having different scalings (that is, respective losses for the function of the neural network can be ascertained in parallel like a classification loss), the additional loss term linking the training of the layers. To this end, two scalings of an input image are able to be processed in parallel by two entities of the neural network, which means there is no need to store the feature maps from the processing of one scaling until the processing of the other scaling. This may also be done for more than two instances.

Figure 5:
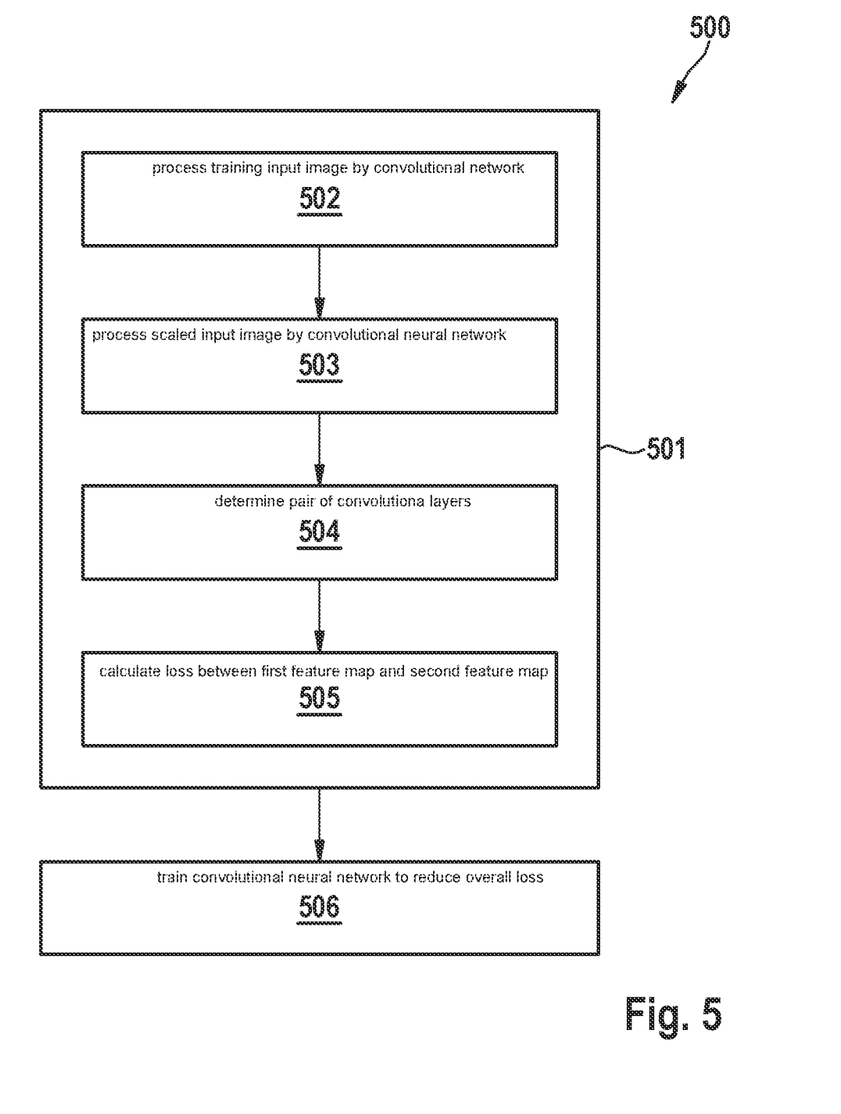
FIG. 5 illustrates a training of a neural network according to one example embodiment of the present invention.

In summary, a method as illustrated in FIG. 5 is provided according to different embodiments.

FIG. 5 shows a flow diagram 500, which represents a method for training a convolutional neural network.

In 501, for each of a multitude of training input images, the training input image is processed by the convolutional network in 502, a scaled version of the training input image is processed by the convolutional network in 503, (at least) one pair of convolutional layers of the convolutional network is determined in 504 so that a convolutional layer of the pair generates a first feature map for the training input image which has the same size as a second feature map which is generated by the other convolutional layer of the pair for the scaled version of the training input image, and a loss between the first feature map and the second feature map is calculated in 505.

In 506, the convolutional neural network is trained to reduce an overall loss, which includes the calculated losses (i.e., the loss calculated for each pair).

The training for reducing the overall loss typically includes an adaptation of the weights of the convolutional neural network (in particular of filter weights) in the direction of a decreasing overall loss.

In this context, it should be noted that a convolutional layer of the convolutional network is understood as a layer that performs a convolution operation on its input data, possibly followed by an activation function, after which pooling takes place or striding is included, which means that the dimension of the output data of the layer is lower than its input data (e.g., the number of components in a longitudinal direction and/or in a width direction is lower in the output data than in the input data in a representation of the input data and output data as a matrix or tensor).

It should furthermore be noted that the steps need not necessarily be carried out in the illustrated sequence. For instance, the training input image and its scaled function may also be processed simultaneously (if two entities of the neural network are used).

The method of FIG. 5 can be carried out by one or more computer(s) using one or more data processing unit(s). The term 'data processing unit' may be understood as any type of entity that allows for the processing of data or signals. The data or signals, for example, may be treated according to at least one (i.e., one or more) special function, which is carried out by the data processing unit. A data processing unit may include an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or some combination thereof or be made up thereof. Some other way of implementing the respective functions, which are described herein in greater detail, may also be understood as a data processing unit or a logic circuit system. One or more of the method steps described here in detail are also able to be executed (e.g., implemented) using a data processing unit by one or more special functions, which are carried out by the data processing unit.

The input data images of the neural network may include sensor signals from different sensors (in image form, i.e., two-dimensional form) such as video, radar, lidar, ultrasonic, motion, and heat-imaging sensors. The processing by the neural network may include the classification of the sensor data or the performance of a semantic segmentation on the sensor data, e.g., in order to detect the presence of objects (in the environment in which the sensor data were obtained).

Although example embodiments were illustrated and described here, one skilled in the art will understand that the example embodiments illustrated and described may be exchanged for a multitude of alternative and/or equivalent implementations without departing from the protective scope of the present invention. This application is meant to cover any adaptations or variations of the example embodiments described herein.

What is claimed is:

1. A method for training a convolutional neural network, the method comprising:
    for each of a multitude of training input images:
        processing the training input image by the convolutional network,
        processing a scaled version of the training input image by the convolutional network,
        determining a pair of convolutional layers of the convolutional network so that a convolutional layer of the pair generates a first feature map for the training input image which has the same size as a second feature map which is generated by the other convolutional layer of the pair for the scaled version of the training input image, and calculating a loss between the first feature map and the second feature map; and training the convolutional neural network to reduce an overall loss which includes the calculated losses.

2. The method as recited in claim 1, wherein the scaled version of the training input image is generated by scaling the training input image using a downsampling factor between successive convolutional layers of the convolutional network, or a power of the downsampling factor, or a reciprocal value of the downsampling factor, or a power of the reciprocal value of the downsampling factor.

3. The method as recited in claim 1, wherein the overall loss furthermore has a training loss for training the convolutional network for a predefined task, and the method further comprises weighting the calculated losses in the overall loss with regard to the training loss.

4. The method as recited in claim 1, further comprising:
determining multiple pairs of convolutional layers of the convolutional network for each of the multiplicity of training input images so that, for each pair of the multiple pairs, a convolutional layer of the pair generates a first feature map for the training input image, which has the same size as a second feature map which is generated by the other convolutional layer of the pair for a respective scaled version of the training input image, and a loss between the first feature map and the second feature map is calculated, and the overall loss includes the losses calculated for the pairs.

5. The method as recited in claim 1, wherein the neural network is trained using a training dataset of training input images, the multiplicity of training input images is selected from the training dataset, and scaled versions of the training input images are generated for the training input images so that the convolutional network has a pair of convolutional layers for each training input image of the multiplicity of training input images and each scaled version of the training input image, so that a convolutional layer of the pair generates a feature map for the training input image which has the same size as a feature map which is generated by the other convolutional layer of the pair for the scaled version of the training input image.

6. A training device for a convolutional neural network, the training device configured to:
for each of a multitude of training input images:
process the training input image by the convolutional network,
process a scaled version of the training input image by the convolutional network,
determine a pair of convolutional layers of the convolutional network so that a convolutional layer of the pair generates a first feature map for the training input image which has the same size as a second feature map which is generated by the other convolutional layer of the pair for the scaled version of the training input image, and
calculate a loss between the first feature map and the second feature map; and
train the convolutional neural network to reduce an overall loss which includes the calculated losses.

7. A non-transitory computer-readable medium on which is stored commands which, when executed by a processor, cause the processor to perform the following steps:
for each of a multitude of training input images:
processing the training input image by a convolutional network,
processing a scaled version of the training input image by the convolutional network,
determining a pair of convolutional layers of the convolutional network so that a convolutional layer of the pair generates a first feature map for the training input image which has the same size as a second feature map which is generated by the other convolutional layer of the pair for the scaled version of the training input image, and
calculating a loss between the first feature map and the second feature map; and
training the convolutional neural network to reduce an overall loss which includes the calculated losses.

* * * * *